United States Patent [19]
Shepard

[11] 3,720,107
[45] March 13, 1973

[54] TEMPERATURE RESPONSIVE ACTUATION

[75] Inventor: Basil S. Shepard, Greenbelt, Md.

[73] Assignee: Westinghouse Electric Corporation, Pittsburgh, Pa.

[22] Filed: Aug. 2, 1971

[21] Appl. No.: 167,937

[52] U.S. Cl. .................. 73/363.7, 60/23, 337/379
[51] Int. Cl. ............................................. G01k 5/70
[58] Field of Search .............. 73/363.7, 363.9; 60/23; 337/111, 379

[56] References Cited

UNITED STATES PATENTS

| | | | |
|---|---|---|---|
| 1,468,689 | 9/1923 | Ernst | 73/363.7 X |
| 2,000,092 | 5/1935 | Norwood | 73/363.7 X |
| 2,225,941 | 12/1940 | Hall | 73/363.7 X |

FOREIGN PATENTS OR APPLICATIONS

| | | | |
|---|---|---|---|
| 529,412 | 11/1940 | Great Britain | 73/363.7 |

Primary Examiner—S. Clement Swisher
Assistant Examiner—Daniel M. Yasich
Attorney—F. H. Henson et al.

[57] ABSTRACT

There is disclosed an actuator having a shaft which, responsive to temperature changes, is rotated by bimetallic coiled members. The members are tightly coiled so that each produces a high spring torque. One member is coiled with the lower-thermal-coefficient-of-expansion layer radially inward and the higher coefficient-of-expansion layer radially outwardly; the other member is coiled with the higher thermal coefficient-of-expansion layer radially inward and the lower coefficient-of-expansion layer radially outward. The inner ends of the members are connected to the shaft and the outer ends to a fixed support; the members being positioned about the shaft with their coils wound oppositely so that the spring torques of the members counteract at any temperature but the torques produced by change in temperature act cumulatively.

8 Claims, 9 Drawing Figures

PATENTED MAR 13 1973　　　　　　　　　3,720,107

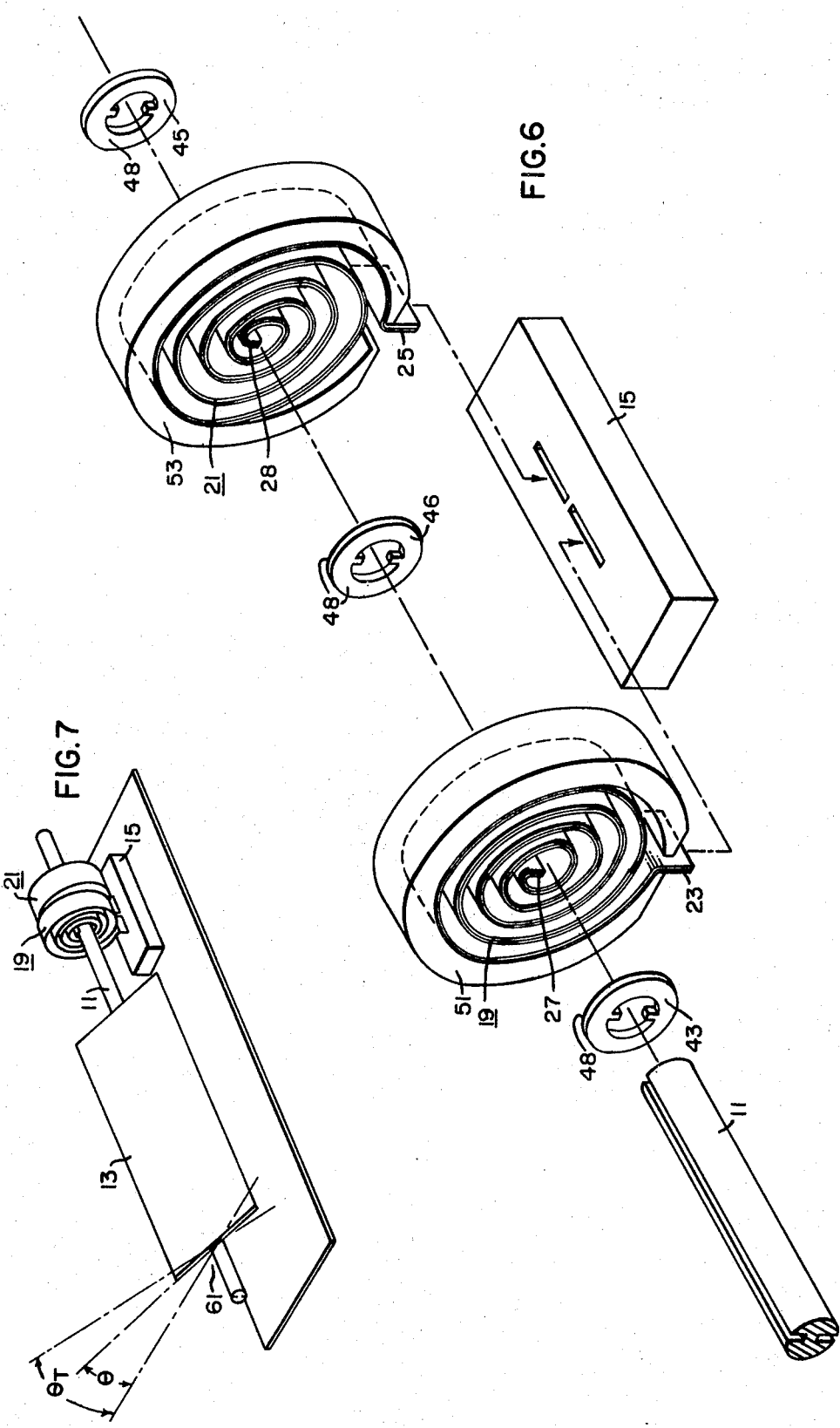

TEMPERATURE RESPONSIVE ACTUATION

BACKGROUND OF THE INVENTION

This invention relates to the art of producing actuation of a mechanism responsive to changes in temperature and has particular relationship to such actuation produced by bimetallic means. Typically such actuation is used in automatic chokes for automobiles, in meters and instruments as typified by Trane U.S. Pat. No. 1,288,296, Hall U.S. Pat. No. 2,225,941, Crum U.S. Pat. No. 2,298,110 and Bowen U.S. Pat. No. 2,681,635, and for thermal controllers on space craft.

It is desirable, particularly in space actuation or the like, that the actuations have a high gain; i.e., that for a given change in temperature the actuator produce a high rotational motion or a high torque. It is an object of this invention to provide high-gain actuation.

High-gain actuation is provided by bi-metallic coiled members or coils, that is, coils formed of a bimetal having contiguous strips or layers of lower and higher thermal coefficient of expansion. Such a coil or member may be wound with the spacing between successive turns the same or with the spacing between successive turns increasing progressively, typically exponentially from the center or center to the outside. Typically the coils may have a spiral configuration or a helical configuration.

In the use of these coils the outer end of the coil is secured to the stationary structure and the inner end of the coil to a rotatable shaft. The coil, in its free state, then actuates the shaft for any change in temperature.

Actuators in accordance with the teachings of the prior art suffer from the disadvantage that the rotational motion for a given change in temperature is low. A particular shortcoming of the spiral configuration in which the spacing between the windings increases progressively is that the length, and consequently the gain, is limited by the fact that as the coil is wound one layer on top of the next, the diameter even of a tightly wrapped coil soon increases to the point where yielding no longer occurs during the winding operation and no further curvature can be induced in the coil. The length of this spiral coil is further limited by limitations on the outer diameter of the coil. On the other hand, the coil, which has a constant radial spacing between windings, can be made of significantly longer bimetallic strip than the coil with the variable spacing before yielding or packaging problems become significant. A major problem with this desirable constant-spacing configuration, however, is that it requires special and more costly fabrication techniques.

It is an object of this invention to overcome the disadvantages of the prior art and to provide a temperature-responsive actuator including a bi-metallic-coil drive which shall have a high rotational motion or torque for a given change in temperature. It is also an object of this invention to provide a method of making such an actuator and a method for operating such an actuator. It is a further object of this invention to provide a low cost bimetallic coil drive in which the spacings of the turns of the coils shall be substantially uniform.

SUMMARY OF THE INVENTION

In accordance with this invention an actuator is provided which includes a pair of bimetallic members or coils both connected to a common driven shaft or pin a the center and to a support, adjacent the shaft, at the periphery. The members are so connected to the shaft that as viewed from any direction along the shaft, one member is wound or coiled clockwise and the other counterclockwise. The high-thermal-coefficient-of-expansion strip or layer of one member is radially outward and its low-thermal-coefficient-of-expansion layer is radially inward; the high-thermal-coefficient-of-expansion strip or layer of the other member is radially inward and the low-thermal-coefficient-of-expansion layer is radially outward.

In assembling the actuator the members are wound tightly and held as wound by clamps. While held by clamps, the inner ends of the members are secured to the shaft and the outer end to the support and then the clamps are released. The members are properly centered and the spring action causes the turns to separate to a limited extent. The torque exerted by the spring forces of the members counteract each other and the shaft is, at any temperature, held in a fixed position. For any change in temperature both members exert torques in the same direction which cause the shaft to rotate. For given temperature change of the support and the coils, rotation proceeds until the two springs are again in static equilibrium. The rotation theoretically is the same to that which would be obtained if either one of the two coils underwent the same temperature change in the free (not prewound) state.

In the interest of reduced cost and ease of production the coils are originally wound in spirals with the spacing between successive turns increasing progressively, preferably exponentially, between the center and the periphery. When the clamps are released the coils assume the configuration of a spiral with the spacing between turns the same. This actuator has the advantage that with the coils of the low-cost variable-turns spacing configuration, the desirability features of constant-turns-spacing coils are achieved.

In the practice of this invention it is desirable to reduce the friction between the turns. Friction may be reduced by use of low-coefficient-of-friction materials for the contacting surfaces of the members or by providing the surfaces with low friction coatings such as polytetrafluoroethylene or molybdenum disulfide. In space-craft uses a layer of 0.0003 inch thickness of molybdenum disulfide is provided.

In the practice of this invention it may also be desirable to retain the coiled members or coils from bulging axially along the shaft. This object is achieved by low-friction restraints suspended from the support.

BRIEF DESCRIPTION OF DRAWINGS

For a better understanding of this invention, both as to its organization and as to its method of operation, together with additional objects and advantages thereof, reference is made to following descriptions taken in connection with the accompanying drawings, in which:

FIG. 6 is a view in perspective showing the manner in which an actuator as shown in FIG. 1 is assembled;

FIG. 7 is a view in perspective showing apparatus according to the invention in which a louver is controlled by bi-metallic coiled means;

DETAILED DESCRIPTION OF INVENTION

Figure 1:
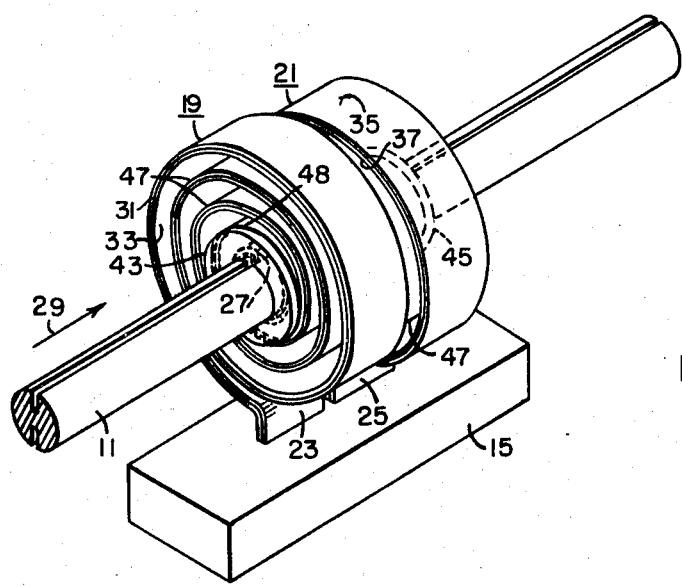
FIG. 1 is a view in perspective showing an actuator embodying this invention.

The apparatus shown in FIG. 1 includes a shaft 11, which is rotatable in bearings (not shown) and which actuates a mechanism (not shown in FIG. 1) such as the louver 13 shown in FIG. 7. The apparatus shown in FIG. 1 also includes a support 15 and bi-metallic coiled members or coils 19 and 21. The peripheral ends 23 and 25 of members 19 and 21 are secured to the support 15 and the inner ends 27 for 19 and 28 (FIG. 6) for 21 are secured in rotating relationship with the shaft 11.

As viewed in the direction of the arrow 29, member 19 is coiled counterclockwise from the center outwardly and member 21 is coiled clockwise.

Each member 19 and 21 is made from strips or layers 31 and 33 and 35 and 37 respectively. Layers 31 and 37, which are radially outward on member 19, and, radially inward on member 21, are of material of higher thermal coefficient of expansion than layers 33 and 35, which are radially inward on member 19, and, radially outward on member 21.

Figure 2:
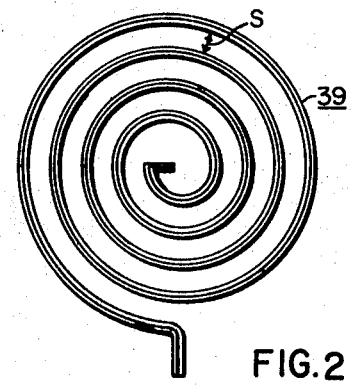
FIG. 2 is a view in end elevation of a coiled member used in the practice of this invention in which the spacing between the turns is substantially uniform.
Figure 4:
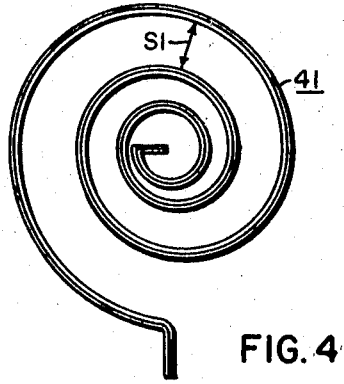
FIGS. 4 and 5 are views corresponding to FIGS. 2 and 3 respectively showing a coiled member in which the spacing between the turns increases progressively from the center outwardly, such a coiled member is referred to as "spiral" in the art.
Figure 3:
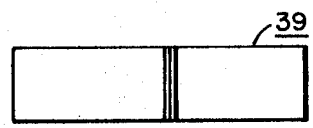
FIG. 3 is a view in side elevation of the member showing in FIG. 2.
Figure 5:
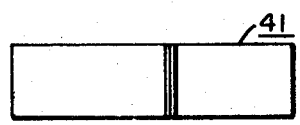

The spacings between the turns of the members 19 and 21 may be uniform, like the spacings S of member 39 shown in FIGS. 2 and 3 or may increase progressively from the center outward like the spacings S1 of member 41 shown in FIGS. 4 and 5. However, preferably the spacing is uniform after the apparatus reaches stable equilibrium with the spring torques of the members counteracting each other. Axial bulging of the turns of the members 19 and 21 is suppressed by retaining discs 43, 45, and 46.

The surfaces of the turns of members 19 and 21 are provided with low-friction coatings 47 to suppress frictional forces between the turns. The discs 43, 45, and 46 are also provided with low-friction coatings 48 on their faces which engage the edges of the turns of the members 19 and 21. The support 15 and the members 19 and 21 are maintained at a common temperature.

FIG. 6 shows how the coiled members 19 and 21 are mounted in the actuator shown in FIG. 1. The members 19 and 21 are coiled tightly and held in the tightly coiled state by C clamps or collars 51 and 53 with their outer ends 23 and 25 extending from the openings in the clamps 51 and 53. The clamps 51 and 53 prevent the members 19 and 21 from unwinding. There is a small amount of rotation at the inner ends 27 and 28 where the members first expand to engage the inner surfaces of the clamps. While the coils 19 and 21 are held ends 23 and 5 are secured to the support 15. There the shaft 11 is centered with respect to the coiled members 19 and 21 and the ends 27 and 28 secured to the shaft. The members 19 and 21 are interposed between the discs 43, 45, and 46 and the clamps 51 and 53 are then removed and the shaft and members 19 and 21 rotate slightly until the torques of the members counterbalance each other. The coiled members 19 and 21 may initially be of the variable-spacing type as shown in FIGS. 4 and 5, with the spacing between turns varying exponentially from the center outward. After mounting as just disclosed the members assume a configuration in which the spacing is substantially uniform as shown in FIGS. 2 and 3.

EXAMPLE

An actuator according to the invention was built and tested. All parts engaging the coils 19 and 21 were made of TEFLON (polytetrafluoroethylene) composition and each coil was coated with mold release of TEFLON composition. A system gain of 6°/°F. was demonstrated with an error of ± 1F° in 20F°. The overall coil diameter was 1.5 inches as opposed to a diameter of 4.0 inches required for the free spiral coil.

The apparatus shown in FIG. 7 includes the louver 13 which is controlled by coiled members 19 and 21. These members are substantially at the temperature of support 15 which is heated by radiation. Increase in the temperature of the support 15 causes the louver 13 to move in the direction closing the opening 61. A number of such louvers each controlled by a bi-metallic coiled actuator means are provided on a space craft. The following discussion deals with the operation of one louver 13 but its conclusions relate to the operation of a plurality of louvers.

The following analysis develops the structural space craft active thermal control system which includes a bi-metallic actuator 19 and 21. The most significant result of this analysis is that to minimize the error in angular position at a given temperature, the thermal gain of the bi-metallic actuator should be as large as practicable. The bi-metallic actuator according to this invention allows the gain value to be increased far beyond that of conventional bi-metallic actuators (particularly spiral configuration in which the spacing between the turns increases progressively) for the same packaging volume. If a small angular position error is required the actuator according to this invention is superior to the conventional prior art actuators. The bi-metal members 19-20 sense the temperature T of the block or support 15 and radiating surface having mass $m$. If the temperature of the block changes from some reference temperature $T_R$, the louver 13 is rotated to some angle $\theta_T$, i.e., $$\theta_T = C_1 (T - T_R) \quad (1)$$

where $C_1$ = position gain of bi-metal members 19, 21.

If any friction is present, the louver 13 would be retarded an it would rotate to the angle $\theta$ (FIG. 7) instead of the angle $\theta_T$.

As the louver blade rotates it blocks more or less of the radiating surface beneath it with the following consequences. Firstly, more energy can be emitted from the system as the louvers open; secondly, more solar energy is absorbed if the factors of orbital geometry permit. Considering these plus the energy transmitted from internal dissipators to the emitting surface beneath the louver 13 (which is intimately connected to the block 15 of mass $m$ ), one finds:

$$mc_p \dot{T} = Q \text{ solar} + \text{internal} - Q \text{ radiated}$$

or $$C_2 \dot{T} = C_3' \text{ Si Sin } \theta + Q_I - C_4' \text{ Sin } \theta \quad (2)$$

wherein
- $C_p$ is a constant of the members 19-21
- $\dot{T}$ is $dT/dt$, $t$ being a time variable
- $Q$ is the energy received, radiated, or developed as indicated by the subscript.
- $C_3'$ is a factor which varies with the position of the space craft and the structure of the louver 13 and the opening 61 which it covers.
- $C_4'$ is a constant of the system.

Considering the torque generated by the bi-metal members as their temperature changes, and its effect on the louver 13.

$$\Sigma \text{ torques} = K(\theta_T - \theta) - f = J\ddot{\theta}$$
$$\ddot{\theta} = \frac{d_2\theta}{dt^2} \quad (3)$$

where
- $K$ = spring constant of bi-metal members.
- $f$ = friction torque
- $J$ = moment of inertial of louver blade Therefore, $K\theta_T = J\ddot{\theta} + f + K\theta$ Note that $f$ may be either viscous or coulomb or some combination of both. It can be assumed in the present case that $f$ is coulomb. A maximum value of $f$ can be set based on the allowable static errors that the system can tolerate. When the bi-metal members change temperature, the louver 13 does not move until enough torque is developed to overcome the static friction $f_s$. Let $\theta e = \theta_T - \theta$ — where $\theta e$ is the angle error produced by static friction.

$$f_s = K\theta_e \quad (5)$$
$$f_s = KC_1 T_e \quad (6)$$
$$T_e = f_s/KC_1 \quad (7)$$

where $T_e$ is the temperature error.

If the temperature continues to rise, the torque exceeds the static friction and the louver 13 moves against dynamic friction $f_d$ until it stops again. This new displacement can be computed by equating the energy $\Delta E$ lost through friction to the change in state of the bi-metal members at constant temperature.

i.e. $\Delta E = \int f d d\theta = (PE)_1 - (PE)_2$ $$(PE)_1 = \frac{1}{2} K\theta_e^2$$
$$(PE)_2 = \frac{1}{2} K\theta_\omega^2$$

where
- $\theta e$ = initial static angular error = $f_s/1T$
- $\theta_\omega$ = static error immediately after the louver breaks initial friction, moves and stops.

$$\Delta E = f_d(\theta_e - \theta_\omega)$$

$$\therefore f_d(\theta_e - \theta_\omega) = \frac{1}{2} K\theta_e^2 - \frac{1}{2} K\theta_\omega^2$$

$$f_d \frac{f_s}{K} - \theta f_d = \frac{1}{2} K \frac{f_s^2}{K^2} - \frac{1}{2} K\theta_\omega^2$$

$$K^2\theta_\omega^2 - 2Kfd\theta_\omega - (f_s^2 - 2fdfs) = 0$$

$$\theta_\omega = \frac{2Kfd \pm \sqrt{4K^2fd^2 + 4(f_s^2 - 2fdfs)k^2}}{2K^2}$$

$$\theta_\omega = \frac{fd}{K} \pm \frac{\sqrt{f_d^2 - 2f_df_s + f_s^2}}{K}$$

$$= \frac{1}{K}[f_d \pm (f_s - f_d)]$$

$$\theta_\omega = \frac{1}{K}[2f_d - f_s]; \frac{f_s}{K}$$

(trivial solution, $\theta = \theta_e, f_s = f_d$)

Let $a = f_s/f_d$, then, $$\theta_\omega = \theta_e[(2/a) - 1)]$$

Figure 9:
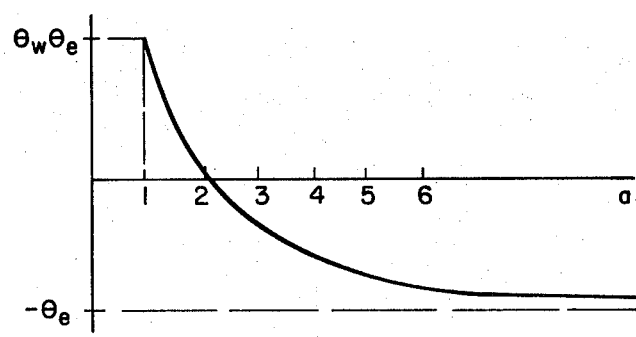
FIG. 9 is a graph illustrating the operation of FIG. 7.

FIG. 9 is a plot of $\theta$ against $a$, $\theta$ being plotted vertically and $a$ horizontally.

Note that $|\theta_\omega| > |\theta_e|$ only if $a < 1$, i.e. the dynamic friction is greater than the static friction which is physically unrealizable. The usual case is for $a \geq 1$. Therefore, the maximum temperature error is the static temperature error:

$$(T_e) = f_s/KC_1 = \theta_e/C_1$$

Note that the error temperature is minimized by minimizing $f_s$ and maximizing either $K$ or $C_1$ or both.

The system stability is considered as follows:

Considering the variation that may occur in the variables, about some nominal values, one finds, in taking the variations of equations (1) through (3).

$$\delta\theta_T = C_1 \delta T \quad (8)$$

for equation 1

$$C_2(\delta \dot{T}) = C_3' \text{Cos}\theta\delta\theta + \delta Q_1 + \text{Sin } \theta \delta C_3' - C_4' \text{Cos } \theta\delta\theta \quad (9)$$

for equation 2 where $\delta C_3'$ represents variations in the solar input because of orbital and satellite altitude variations.

$$K\delta\theta_T = J(\delta\ddot{\theta}) + \delta f + K\delta\theta \quad (10)$$

for equation 3
where $\delta f = \delta f(\dot{\theta})$
Rewriting (9)

$$C_2(\delta \dot{T}) = C_3 \delta\theta - C_4 \delta\theta + \delta Q_1 + \delta Q_s \quad (11)$$

where (Sin $\theta \delta C_3'$) is simply restated as $\delta Q_s$, the variation in solar load.

Figure 8:
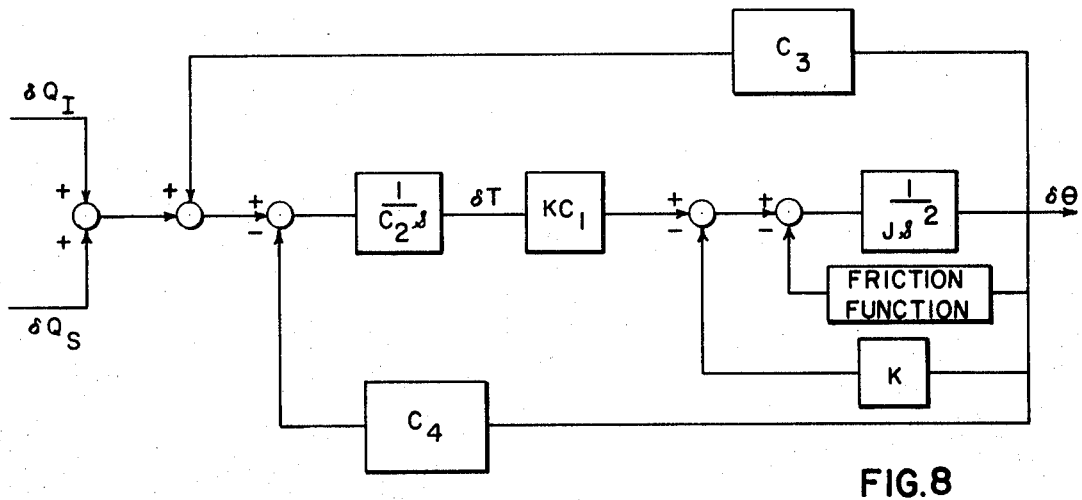
FIG. 8 is a diagram presenting an electrical analogue of FIG. 7.

The control diagram for equations (8), (10), and (11) is shown in FIG. 8 where it may be noted that if $C_3$ is greater than $C_4$, then the feedback is positive and the louver system is unstable, i.e. a solar input heats the radiating surface, causing the louver to open more, thereby increasing the absorbed solar energy causing further opening etc.

Stability in terms of the Routh-Hurwitz criterion requires that:

$$1/\omega n^2 > 0 \quad (1)$$
$$2 \zeta/\omega n > 0 \quad (2)$$
$$C_1 C_5/C_2 < 2\zeta\omega n \quad (3)$$

where the characteristic equation is $1 + GH = S[(1/\omega n^2) + (2\zeta/\omega n)S + 1)] + C_1C_5/C_2$ $$C_5 = C_4 - C_3,$$

and $\zeta$ is the equivalent damping factor.

In other words, it is required that the friction be non zero, which in practice is readily obtained, and that the friction be greater than some value based on the gain factors associated with the spring constant $(C_1)$ of the bi-metal members, the radiator $(C_5)$ and the thermal capacity associated the mass attached to each louver ($C_2$). An equivalent value of $\zeta$ for a system with coulomb friction may be obtained as follows. It is assumed that cyclic motion occurs and when it does, each system i.e. the viscous and coulomb systems, dissipates the same energy.

For the viscous system:

$$\Delta E/\text{cyc} = \oint F d\theta = \oint \frac{F d\theta}{dt} dt = \oint F\dot\theta dt$$

$$= \oint C\dot\theta^2 dt$$

where $C = 2\zeta\omega n J$

Assuming cyclic motion, let $\theta = A \sin \omega t$ $$E/\text{cyc} = CA^2 \oint \omega^2 \sin^2 \omega t\, dt$$

$$= CA^2\omega \oint_0^{2\pi} \sin^2 (\omega t) d(\omega t)$$

$$= CA^2 \left[ \tfrac{1}{2}X - \tfrac{1}{4} \sin 2X \right]_0^{2\pi}$$

$$= \pi\omega c A^2 \qquad (12)$$

For a coulomb friction system, also assuming cyclic motion, $$\Delta E/\text{cyc} = \oint F dd\theta = 4 f d A \qquad (13)$$

Comparing systems and equating energy loss per cycle, $$C_{eq} = 4fdA/\pi\omega A2 = 4fd/\pi\omega A$$

or $$2\zeta_{eq}\omega n = 4fd/\pi\omega JA \qquad (14)$$

Thus it is required for stability that $$4fd/\pi\omega JA > C_1 C_5/C_2$$

Thus it is required for stability that $$4fd/\pi\omega JA > C_1 C_5/C_2$$

or $$fd (\pi/4)(JA\omega)(C_1 C_5/C_2)$$

For maximum specified static error it is required that $$fs < C_1 K T e$$

As an example for demonstrating feasibility, one can evaluate the stability requirements taking values which are applicable in a practical situation system. Taking a conservative approach, let $C_5 = C_4$ (i.e. $C_3 = 0$), and let $$C_1 = f_s / KTe$$

instead of $C_1 < f_s / KT_e$
It is required that $C_4 < (4/\pi)(fd/\omega JA)(C_2/C_1)$
$\phantom{C_4} < (4/\pi)(fd/\omega JA)(C_2/f_s KTe$
$\phantom{C_4} < (4/\pi)(fd/fs)(\omega n/\omega)(TeC_2/A$ For $\omega n = 24$ r/sec $$fd/fs = 1/a \approx \tfrac{1}{2}$$

$$Te = 3°F$$

$$C_2 = MC_p = (W)(0.2 \text{ BTU/lb°F}) = 1 \text{ BTU/°F}$$

(for $w = 120\# /24$ louvers $= 5\#$ /louver). To be extra conservative let $w = \omega n$ instead of being equal to the orbital rate, and select $A$ to be as high as possible, namely $A = \pi/4$ radians.
Therefore, $$C_4 < (4/\pi) \tfrac{1}{2} (24)(3)(1.0)/\pi/4$$

$$C_4 < 58.3 \text{ B.t.u./sec. rad.} \times \frac{3600 \text{ sec./hr.}}{3.4 \text{ B.t.u./watt hr.}}$$

$$C_4 < 61,800 \text{ watts/rad}$$

This is easily satisfied. It is also desirable to maintain $C_4 > C_3$ so that the louvers do not open when exposed to solar inputs. This usually requires shades if the orbital geometry permits solar energy to enter the louver system. The remaining condition is that $$f_s < KC_1 Te$$

This condition may be met by minimizing $f_s$ by reducing static friction or by maximizing $K$ $$f_s = K\theta_e$$

and/or $C1$ $$f_s = KC_1 t_e$$

The actuator according to this invention has the following principal advantages:

1. For the same functional and packaging requirements, this actuator can be manufactured more readily and at a lower cost than the prior-art actuator with a coil with equally spaced turns because of the special machinery required to wind such a coil.

2. For a given length, shaft diameter, overall width and maximum allowable outer diameter, the actuator according to this invention produces a greater torque than the prior art. This is because a thicker material may be used. This is especially important for minimizing static errors in a louver system.

3. Conversely, for a given shaft diameter, material thickness and maximum outer diameter, the length of the bimetallic material and hence the gain of the actuator according to this invention can be increased far beyond that of the prior-art actuators. 4. For a given shaft diameter, material thickness, and desired gain, the actuator according to the invention can be packaged in significantly less volume than the prior art actuators.

5. The system including the actuator according to the invention is a stiffer system in both the axial and radial directions and thus is advantageous in vibration and shock environments.

6. The fact that all turns of the coil configuration of the invention are in closer proximity to one another than the turns of the prior art actuator to assure a uniform temperature along the length of the coil by improving the view factor between coil turns.

While specific embodiments of this invention have been disclosed herein many modifications thereof are feasible. This invention is not to be restricted except insofar as is necessitated by the spirit of the prior art.

I claim:

1. A small-volume high-gain thermally responsive mechanical actuator including a supporting structure, a shaft rotatable relative to said supporting structure, a first coiled bi-metallic member having a fixed end connected to said supporting structure and a movable end in rotating engagement with said shaft, said member including a first strip having a lower thermal coefficient of expansion radially outward with respect to said shaft and a second strip of higher thermal coefficient of expansion radially inward with respect to said shaft, a second coiled bi-metallic member having a fixed end connected to said supporting structure and a movable end connected in rotating engagement with said shaft, said second member including a first strip of higher thermal coefficient of expansion radially outward with respect to said shaft and a second strip of lower thermal coefficient of expansion radially inward with respect to said shaft, one of said members being wound clockwise as viewed from one direction along said shaft and the other of said members being wound counterclockwise as viewed from said direction along only said shaft, said shaft being freely rotatable responsive to the sum of the torques exerted by said first and second members when the temperature of said strips changes.

2. The actuator of claim 1 wherein each member is wound into a tight coiled spring configuration, the spring of each member exerting a torque and exerted by the spring of one member counteracting the torque exerted by the spring of the other member at any temperature.

3. The actuator of claim 1 including means for maintaining the first and second members at a common temperature the shaft being rotatable in dependence upon the sum of the torques exerted by both members when the common temperature changes.

4. the actuator of claim 1 wherein the turns of the coiled members have low-friction surfaces so that friction between contiguous turns that may be in contact is minimized.

5. The actuator of claim 1 including means for restraining the members from bulging axially.

6. Apparatus responsive to the temperature of a region, including a supporting structure contiguous to said region, a shaft rotatable with respect to said supporting structure, first and second coiled bi-metallic members, both maintained at said temperature of said region, each said member having a fixed end connected to said supporting structure and a movable end connected in rotating engagement with said shaft, said first member including a first strip of lower thermal coefficient of expansion radially outward with respect to said shaft and a second strip of higher thermal coefficient of expansion radially inward with respect to said shaft, said second member having a first strip of higher thermal coefficient of expansion radially outward with respect to said shaft and a second strip of lower thermal coefficient of expansion radially inward with respect to said shaft, one of said members being coiled clockwise as viewed from one direction along said shaft and the other member being coiled counterclockwise as viewed from said direction, said shaft being freely rotatable by the sum of the torques exerted by said first and second members where said temperature changes.

7. The method of actuating a mechanism in dependence upon temperature by means of first and second coaxial coiled bi-metallic members, one of said members having a first strip of lower thermal coefficient of expansion radially inward and a second strip of higher thermal coefficient radially outward with respect to the axis and the other member having a strip of higher thermal coefficient of expansion radially inward and a second strip of lower thermal coefficient radially outward with respect to the axis, the said method comprising connecting one of said members to said mechanism so that from a given viewpoint it is coiled clockwise and exerts a spring torque tending to rotate said mechanism in one direction and responsive to a change in temperature of a given polarity exerts a torque rotating said mechanism in said one direction, connecting said other of said members to said mechanism so that from said viewpoint it is wound counterclockwise and exerts a spring torque counteracting the spring torque of said one member and responsive to said change of temperature of said given polarity exerts a torque rotating said mechanism in said one direction, and maintaining both said members at a common temperature whereby for any change in temperature said mechanism is caused to be rotated by the sum of the torques exerted by said members as a result of the change in temperature.

8. The method of claim 7, wherein in each member, prior to connection to the mechanism, the spacing between successive turns increases progressively from the center outwardly and, after the said members are mounted with their spring torques counteracting, the member assumes a configuration in which the spacings between successive turns are substantially the same.

* * * * *